US012763036B2

(12) United States Patent
Bower et al.

(10) Patent No.: US 12,763,036 B2
(45) Date of Patent: Oct. 13, 2026

(54) DISPLAY AMPLIFIERS

(71) Applicant: Daktronics, Inc., Brookings, SD (US)

(72) Inventors: Christopher Andrew Bower, Raleigh, NC (US); Matthew Alexander Meitl, Durham, NC (US); Ronald S. Cok, Rochester, NY (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 18/746,948

(22) Filed: Jun. 18, 2024

(65) Prior Publication Data

US 2025/0384850 A1 Dec. 18, 2025

(51) Int. Cl.

| | |
|---|---|
| ***G09G 3/34*** | (2006.01) |
| ***G09G 3/36*** | (2006.01) |
| ***H04N 23/71*** | (2023.01) |
| ***H04N 23/74*** | (2023.01) |
| ***H04N 23/76*** | (2023.01) |

(52) U.S. Cl.

CPC ......... *G09G 3/3426* (2013.01); *G09G 3/3413* (2013.01); *H04N 23/71* (2023.01); *H04N 23/74* (2023.01); *H04N 23/76* (2023.01); *G09G 3/36* (2013.01); *G09G 2320/0626* (2013.01); *G09G 2360/14* (2013.01)

(58) Field of Classification Search

CPC ...... G09G 3/3426; G09G 3/3413; G09G 3/36; G09G 2320/0626; G09G 2360/14; H04N 23/71; H04N 23/74; H04N 23/76; G02B 23/12; G02B 23/125

See application file for complete search history.

(56) References Cited

U.S. PATENT DOCUMENTS 4,328,516 A * 5/1982 Colpack .................... H04N 3/09 348/E3.01
5,332,899 A * 7/1994 Wolny .................... H10F 55/15 257/E27.137
5,519,227 A * 5/1996 Karellas .................. G01T 1/202 250/483.1
6,046,714 A * 4/2000 Lim .......................... G09G 3/22 313/105 CM
7,235,768 B1 * 6/2007 Post ....................... G02B 23/12 348/E5.09
9,520,537 B2 12/2016 Bower et al.
9,620,341 B2 * 4/2017 Chuang ................. H10F 77/306
10,944,027 B2 3/2021 Bower et al.
11,164,934 B2 11/2021 Bower et al.
2004/0196566 A1 * 10/2004 Beystrum .............. H04N 23/11 348/E5.09
2008/0166061 A1 * 7/2008 Hohenberger ......... H04N 23/20 382/254
2008/0179520 A1 * 7/2008 Kauffman .............. G02B 23/12 348/E5.081

(Continued)

*Primary Examiner* — Chiawei Chen

(74) *Attorney, Agent, or Firm* — Schwegman Lundberg & Woessner, P.A.

(57) ABSTRACT

A display amplifier includes an amplifier substrate, an array of light detectors disposed on or over the amplifier substrate, an array of light emitters disposed on or over the amplifier substrate, and an amplifier circuit operable to capture an image using the array of light detectors and display the captured image using the array of light emitters. A scene display can be disposed to emit light to the light detectors at close range. The light emitters can be brighter than the scene display.

20 Claims, 17 Drawing Sheets

(56) References Cited

U.S. PATENT DOCUMENTS

| | | | | |
|---|---|---|---|---|
| 2015/0288888 | A1* | 10/2015 | Alsheuski | H04N 5/2628<br>348/240.2 |
| 2020/0074603 | A1* | 3/2020 | Vollmerhausen | G06T 5/73 |
| 2020/0402757 | A1* | 12/2020 | Smith | H01J 21/105 |
| 2023/0101352 | A1* | 3/2023 | LeBeau | G03B 13/36 |
| 2023/0110707 | A1* | 4/2023 | Becker | H10K 59/60<br>348/217.1 |
| 2023/0135448 | A1* | 5/2023 | Burnsed | G02B 27/0189<br>345/633 |
| 2023/0305285 | A1* | 9/2023 | LeBeau | H01J 23/54 |
| 2024/0267603 | A1* | 8/2024 | Hunt | H04N 5/30 |

* cited by examiner

DISPLAY AMPLIFIERS

TECHNICAL FIELD

The present disclosure relates generally to displays and the visibility of displays under ambient illumination.

BACKGROUND

Displays are widely used to present information and display video streams and displays can be emissive or reflective. When seen in relatively dark surroundings, emissive displays are relatively easy to view and reflective displays are difficult to view. In bright surroundings, the opposite is true. Many emissive displays lack sufficient luminance in bright surroundings, particularly emissive displays in portable electronic devices that have limited electrical battery power, for example in digital cameras and cell phones viewed outdoors on a sunny day.

There is a need, therefore, for devices and systems to render displays visible under various illumination conditions.

SUMMARY

The present disclosure provides, inter alia, architectures, structures, systems, devices, and methods that provide improved visibility for displays under a variety of illumination conditions.

In embodiments, of the present disclosure, a display amplifier can comprise an amplifier substrate, an array of light detectors disposed on the amplifier substrate, an array of light emitters disposed on the amplifier substrate, and an amplifier circuit operable to capture an image using the array of light detectors and display the captured image using the array of light emitters. The amplifier substrate can be at least partially transparent to light received by the light detectors and the light detectors can be disposed to receive light through the amplifier substrate. The amplifier substrate can be at least partially transparent to light emitted by the light emitters and the light emitters can be disposed to emit light through the amplifier substrate.

In some embodiments, light incident on the light detectors travels in a direction and the light emitters emit light in the same direction away from the light detectors. The amplifier substrate can have a side and the array of light detectors and the array of light emitters can be both disposed on the side. Thus, the light detectors can be arranged to receive light from a direction and the light emitters can be arranged to emit light away from the light detectors along the direction. In some embodiments, the amplifier substrate has an emission side and a detection side opposite the emission side, the array of light emitters is disposed on the emission side, and the array of light detectors is disposed on the detection side.

In some embodiments, the light detectors and the light emitters are disposed on a surface of the amplifier substrate and the light emitters and the light detectors are interdigitated or interspersed in a direction parallel to the surface. In some embodiments, the light detectors and the light emitters are disposed on a surface of the amplifier substrate and the light emitters and the light detectors are at least partially stacked in layers in a direction orthogonal to the surface.

Some embodiments of the present disclosure comprise color filters disposed on the amplifier substrate. The color filters can be operable to filter light incident on ones of the light detectors. The color filters can be disposed directly on the light detectors or on a side of the amplifier substrate opposite the light detectors so that light incident on ones of the light detectors is filtered by the color filters.

In some embodiments, a convex hull around the light detectors has a detection area and a convex hull around the light emitters has an emission area on the amplifier substrate, and the detection area is substantially equal to the emission area, e.g., within manufacturing tolerances, the detection area is within 90% or 110% of the emission area, the detection area is within 80% or 120% of the emission area, or the detection area is within 50% or 150% of the emission area. Thus, the detection area can be in a range of from 50% to 150% of the emission area (e.g., is in a range of from 80% to 120%, from 90% to 110%, from 95% to 105%, from 98% to 102% of the emission area). In some embodiments, the emission area can be greater than the detection area. In some embodiments, the detection area can be greater than the emission area.

Some embodiments of the present disclosure comprise a scene and the scene can be exposed onto the array of light detectors. The scene can be provided by a scene display or a planar surface adjacent to the array of light detectors. The scene display (e.g., a flat-panel display) can provide a planar surface on which a scene is displayed and provides light that is incident on the light detectors. In some embodiments, the light detectors are disposed at a light-detector pitch separating centers of adjacent light detectors and the scene can be disposed (e.g., on a scene display or planar surface) no more than a distance equal to the light-detector pitch from the amplifier substrate or no more than a distance equal to one half of the light-detector pitch from the amplifier substrate. In some embodiments, adjacent light detectors are spatially separated by a light-detector spacing and the scene can be disposed no more than a distance equal to the light-detector spacing from the amplifier substrate or no more than a distance equal to one half of the light-detector spacing from the amplifier substrate. In some embodiments, the amplifier substrate can be disposed in contact with the scene display or planar surface. In some embodiments, the light detectors are no more than ten mm, five mm, two mm, one mm, 0.75 mm, 0.5 mm, 0.25 mm, or 0.1 mm away from the scene (e.g., on a scene display or planar surface).

According to some embodiments of the present disclosure, the number of light emitters is the same as the number of light detectors. In some embodiments, the number of light detectors is greater than the number of light emitters. In some embodiments, the number of light emitters is greater than the number of light detectors. In some embodiments, a resolution of the light detectors is equal to a resolution of the scene display. In some embodiments, a resolution of the light detectors is less than a resolution of the scene display. In some embodiments, a resolution of the light detectors is greater than a resolution of the scene display. In some embodiments, a resolution of the light detectors is less than a resolution of the scene display. In some embodiments, a resolution of the light detectors is greater than a resolution of the scene display. In some embodiments, the detection area is no less than the area of the scene display, or a portion of the scene display displaying a scene. In some embodiments, the detection area is greater than the area of the scene display, or a portion of the scene display displaying a scene, for example 10%, 20%, 30%, 40%, or 50% greater (e.g., has an area 1.1, 1.2, 1.3, 1.4, 1.5 times as large). In some embodiments, the detection area is less than the area of the scene display, or a portion of the scene display displaying a scene, for example 90%, 80%, 70%, or 50% less.

In some embodiments, the scene is directly imaged onto the light detectors so that adjacent light detectors receive at least some different light from different portions of the scene and the light detectors can each image or capture light from different portions of the scene. Thus, in embodiments, the light detectors are arranged so that adjacent light detectors capture at least some different light from different portions of a scene directly imaged onto the light detectors. Direct imaging can be accomplished by locating the scene (e.g., from a display or surface) spatially close to or in contact with the light detectors. In other embodiments, light from the scene passes through an optical structure (e.g., passes through one or more lenses between the scene and the light detectors and/or one or more lenses disposed on the light detectors or the amplifier substrate, e.g., micro-lenses or a lenslet array disposed on the light detectors or the amplifier substrate) to image the scene onto the light detectors.

In embodiments, a resolution of the array of light detectors can be substantially equal to (e.g., no more than 10% different from) a resolution of the array of light emitters.

In some embodiments of the present disclosure, an amplifier circuit comprises distributed amplifier circuits and each of the distributed amplifier circuits can be connected to a light detector but less than all of the light detectors and a light emitter but less than all of the light emitters. Each amplifier circuit can be connected to only one light detector and to only one light emitter. Each amplifier circuit can be connected to only two, four, six, eight, twelve, sixteen, twenty four, thirty-two, forty-eight, or sixty-four light detectors and to only two, four, six, eight, twelve, sixteen, twenty four, thirty-two, forty-eight, or sixty-four light emitters.

In some embodiments of the present disclosure, a display amplifier comprises an array of amplifier pixels. Each amplifier pixel can comprise a light emitter, a light detector, and an amplifier circuit operable to control the light detector to capture light and control the light emitter to emit light corresponding to the captured light. Each amplifier pixel in the array of amplifier pixels can be separate, individual, and independent from any other amplifier pixel in the array of amplifier pixels.

Some embodiments of the present disclosure comprise a scene illuminator disposed on the display amplifier. For example, an LED controlled by the amplifier circuit can emit light away from the amplifier substrate in the direction from which light incident on the light detectors comes.

In some embodiments of the present disclosure, the light emitters are inorganic light-emitting diodes, inorganic diode lasers, or vertical cavity surface emission lasers (VCSELs).

In some embodiments of the present disclosure, an area of the amplifier substrate is no less than four $cm^2$, no less than eight $cm^2$, no less than sixteen $cm^2$, no less than twenty four $cm^2$, no less than sixty four $cm^2$, no less than ninety six $cm^2$, or no less than one hundred twenty eight $cm^2$. In some embodiments of the present disclosure, an area of a convex hull of the array of light detectors or the array of the light emitters on the amplifier substrate is no less than four $cm^2$, no less than eight $cm^2$, no less than sixteen $cm^2$, no less than twenty four $cm^2$, no less than sixty four $cm^2$, no less than ninety six $cm^2$, or no less than one hundred twenty eight $cm^2$.

Some embodiments comprise a brightness control operable to control the brightness of the light emitters or comprise a gain control operable to control the sensitivity of the light detectors, or both. A brightness or gain control can be an electronic circuit controlled by the amplifier circuit and can be used to adapt to environmental conditions around the display amplifier.

In some embodiments of the present disclosure, the light detectors comprise color detection pixels, the light emitters comprise color emission pixels. In embodiments, the color emission pixels provide more saturated colors than are detected by the color detection pixels.

In some embodiments, the amplifier substrate comprises two or more layers laminated together. Light detectors can be disposed on one of the layers and the light emitters can be disposed on the other of the layers. In some embodiments, the sides of the layers opposite the light detectors and the light emitters can be adhered together. In some embodiments, either (or both) of the sides of the layers on which the light detectors or light emitters are disposed are adhered between the two layers. In such embodiments, either or both of the layers can be transparent, for example no less than 50%, 70%, 80%, 90%, or 95% transparent to the frequencies of light emitted by the light emitters or captured by the light detectors.

According to embodiments of the present disclosure, a display amplifier can comprise a transparent amplifier substrate having a side or surface, for example an extensive surface on which an array of light emitters can be disposed and can be operable to emit light through the transparent amplifier substrate along a direction. An array of light detectors can be disposed on the side and can be operable to detect light incident on the light detectors from the direction. In embodiments, an amplifier circuit can be operable to capture an image using the array of light detectors and display the captured image using the array of light emitters.

According to embodiments of the present disclosure, a display amplifier can comprise a transparent amplifier substrate having a side or surface. An array of light emitters can be disposed on the side and can be operable to emit light away from the transparent amplifier substrate along a direction, e.g., an emission direction. An array of light detectors can be disposed on the side operable to detect incident light through the transparent amplifier substrate from the direction, e.g., so that the direction of light incident on the light detectors is the same direction as the emission direction. An amplifier circuit can be operable to receive (e.g., capture or detect) an image using the array of light detectors and display the received (captured) image using the array of light emitters.

According to embodiments of the present disclosure, a display amplifier system can comprise a display amplifier and a scene display separate from the display amplifier. The scene display can be disposed no greater than twenty millimeters from the display amplifier, no greater than ten millimeters from the display amplifier, no greater than five millimeters from the display amplifier, no greater than two millimeters from the display amplifier, no greater than one millimeter from the display amplifier, no greater than five hundred microns from the display amplifier, no greater than two hundred fifty microns from the display amplifier, no greater than one hundred microns from the display amplifier, no greater than fifty microns from the display amplifier, or in contact with the display amplifier or any layers disposed on the display amplifier, for example from the light detectors or layers disposed on the light detectors. In embodiments, the scene display is a liquid crystal display (LCD). In some embodiments, the light emitters in the array of light emitters are brighter than the LCD, so that the display amplifier displays the scene brighter than the scene display displays the scene. For example, the light emitters are brighter than the scene display.

In some embodiments, a display amplifier system can comprise an illuminator disposed on the display amplifier operable to illuminate the scene display or a scene.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1A:
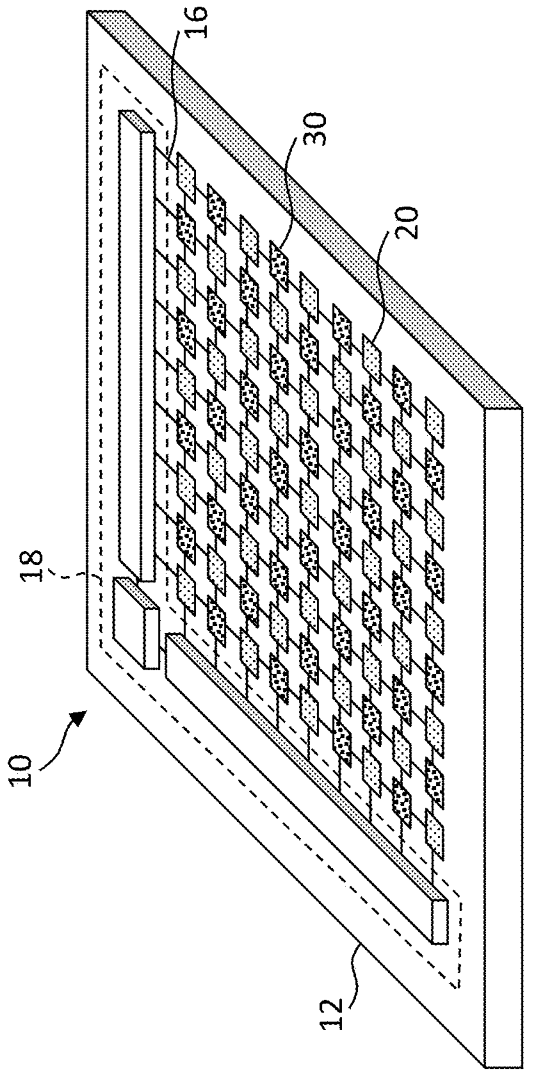
FIG. 1A is a perspective and top view of a display amplifier according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not necessarily drawn to scale.

DETAILED DESCRIPTION OF CERTAIN EMBODIMENTS

Displays, especially portable, battery-operated displays with limited electrical power, can suffer from a lack of adequate luminance when viewed in high-brightness environments, such as bright sunshine, for example having a luminance of 1,000 to 10,000 lumens, 10,000 to 50,000 lumens, or 50,000 to 100,000 lumens. When such bright ambient light illuminates a display, for example with 1,000 to 10,000 lux (lumens per square meter), 10,000 to 50,000 lux, or 50,000 to 100,000 lux, the emissive displays can appear relatively dim to the human eye and can be effectively unviewable in the ambient environment. Embodiments of the present disclosure provide a display amplifier that can record a scene, for example as displayed on a display, and re-display the scene brighter.

According to embodiments of the present disclosure and as illustrated in FIG. 1A, a display amplifier 10 can comprise an amplifier substrate 12, an array of light detectors 30 disposed on amplifier substrate 12, an array of light emitters 20 disposed on the same amplifier substrate 12, and an amplifier circuit 18 operable to capture an image using the array of light detectors 30 and display the captured image using the array of light emitters 20. Amplifier circuit 18 can be electrically connected to light emitters 20 and light detectors 30 through wires 16 and can control light emitters 20 and light detectors 30 directly or using matrix-addressing. As illustrated in the Figures, wires 16 can also represent multiple separate wires or a bus comprising multiple wires. A wire is an electrical conductor that can conduct or transmit power, ground, or signals.

As used herein, a first structure disposed on a second structure can, but does not necessarily, include a layer between the first structure and the second structure. For example, an array of light emitters 20 disposed on an amplifier substrate 12 can include the array of light emitters

20 disposed on a light-emitter module substrate with the light-emitter module substrate disposed on the amplifier substrate 12. Similarly, an array of light detectors 30 disposed on an amplifier substrate 12 can include the array of light detectors 30 disposed on a light-detector module substrate with the light-detector module substrate disposed on the amplifier substrate 12.

Figure 1B:
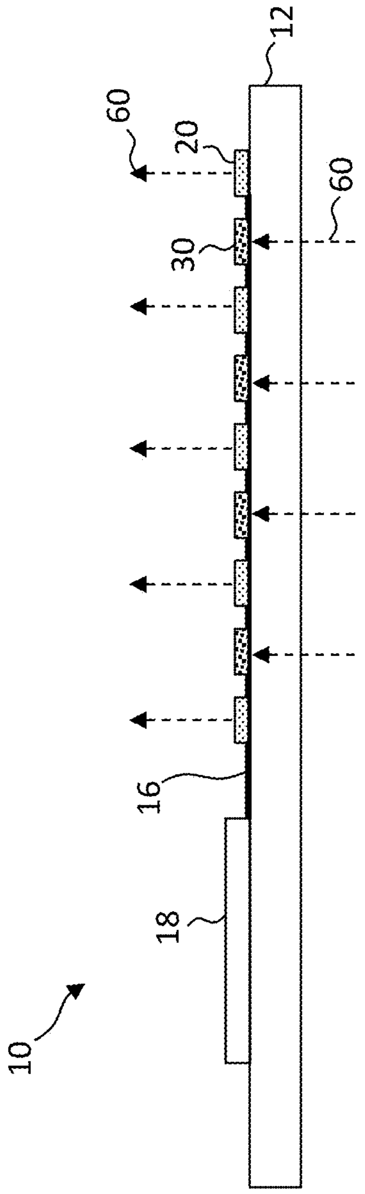
FIG. 1B is a cross section of a display amplifier capturing light through an amplifier substrate according to illustrative embodiments of the present disclosure.
Figure 1C:
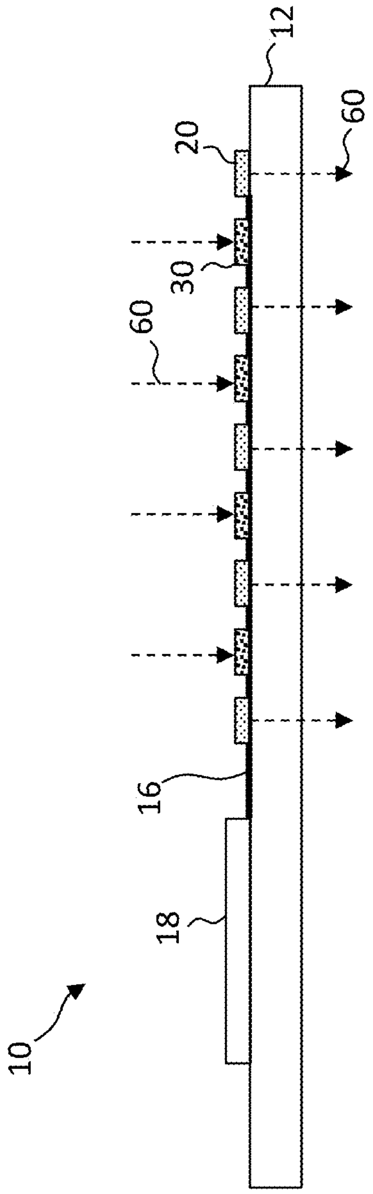
FIG. 1C is a cross section of a display amplifier emitting light through an amplifier substrate according to illustrative embodiments of the present disclosure.

In some embodiments and as shown in FIGS. 1B and 1C amplifier substrate 12 can be at least partially transparent to light 60 emitted by light emitters 20 or light 60 detected (e.g., received, captured, or absorbed) by light detectors 30, for example at least 50%, 60%, 70%, 80%, 90%, or 95% transparent to such light. In some embodiments and as shown in FIGS. 1B and 1C, light emitters 20 and light detectors 30 are disposed on a common surface (side) of amplifier substrate 12. In some embodiments, light emitters 20 and light detectors 30 are disposed directly on and in contact with the common surface (side) of amplifier substrate 12 or a layer disposed on the common surface of amplifier substrate 12. As shown in FIG. 1B, light detectors 30 are disposed to receive light 60 through amplifier substrate 12 and light emitters 20 are disposed to emit light 60 away from and not through amplifier substrate 12. As shown in FIG. 1C, light emitters 20 are disposed to emit light 60 through amplifier substrate 12 and light detectors 20 are disposed to receive light 60 that has not passed through amplifier substrate 12. As also shown in FIGS. 1A-1C, light detectors 30 and light emitters 20 are disposed on a surface (e.g., a common surface or side) of amplifier substrate 12 and light emitters 20 and light detectors 30 are interdigitated or interspersed in a direction parallel to the common surface.

Figure 2A:
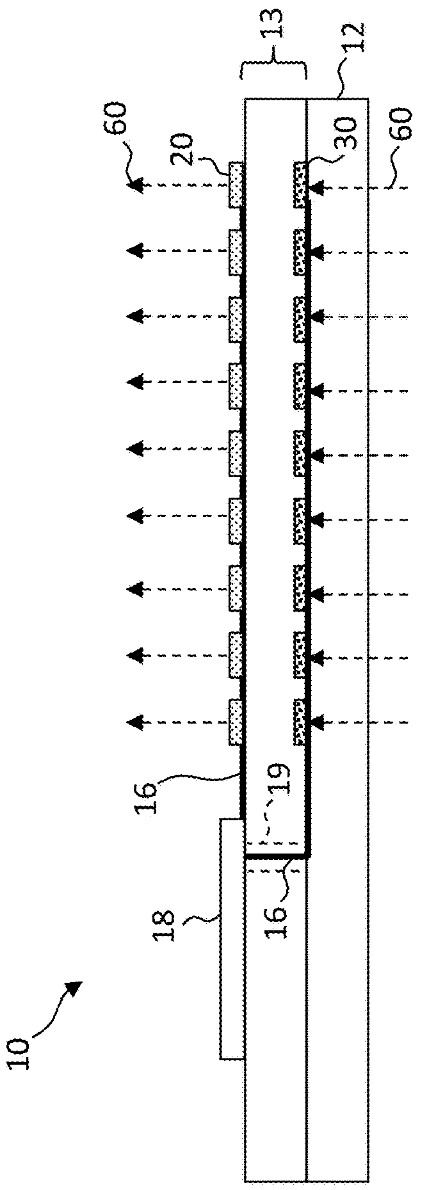
FIG. 2A is a cross section of a display amplifier with stacked light emitters and light detectors that capture light through an amplifier substrate according to illustrative embodiments of the present disclosure.
Figure 2B:
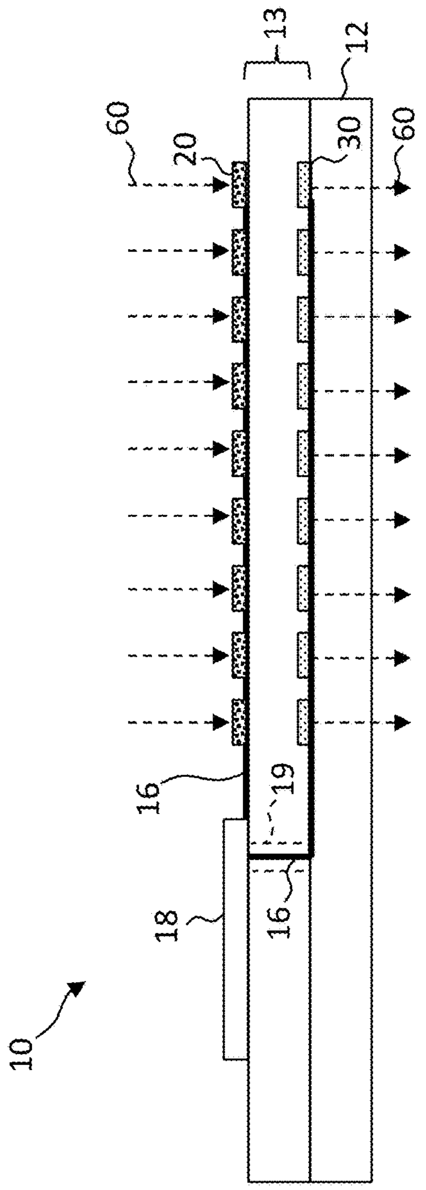
FIG. 2B is a cross section of a display amplifier with stacked light detectors and light emitters that emit light through an amplifier substrate according to illustrative embodiments of the present disclosure.

As shown in FIGS. 2A and 2B, light emitters 20 and light detectors 30 are stacked (disposed) on a common side (e.g., a common surface) of amplifier substrate 12 at least partially in different layers and can be but are not necessarily interspersed or interdigitated. The different layers of electrical connections (e.g., wires 16) can correspond to different metal layers as are known in photolithographic processing and can be separated by layers of dielectric material (e.g., metal-and-dielectric layers 13). Although light emitters 20 and light detectors 30 are shown in vertical alignment in the Figures, in some embodiments there is no requirement that light emitters 20 and light detectors 30 are aligned. As shown in FIG. 2A, light detectors 30 are disposed to receive light 60 that has passed through amplifier substrate 12 and light emitters 20 are disposed to emit light 60 away from and not through amplifier substrate 12. As shown in FIG. 2B, light emitters 20 are disposed to emit light 60 through amplifier substrate 12 and light detectors 20 are disposed to receive light 60 that has not passed through amplifier substrate 12.

Figure 3:
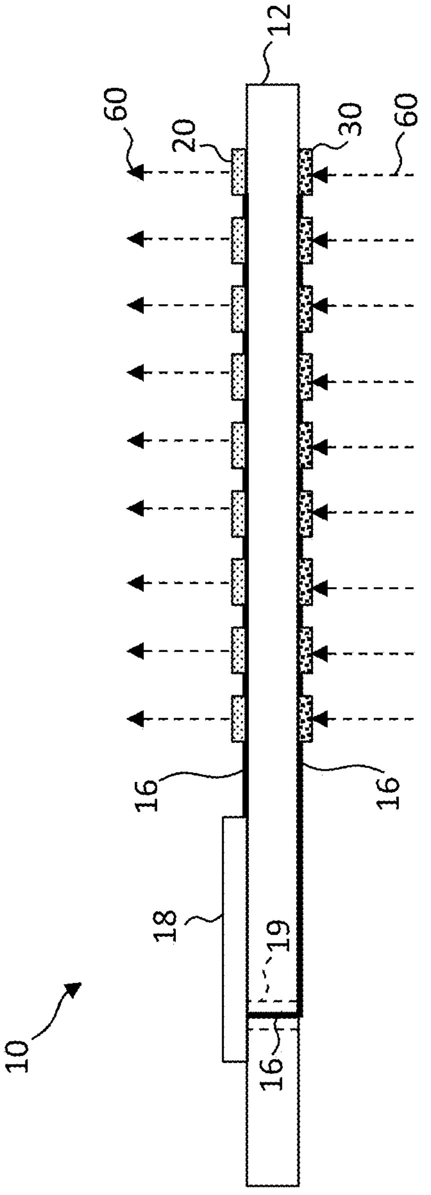
FIG. 3 is a cross section of a display amplifier with light detectors and light emitters on opposite sides of an amplifier substrate according to illustrative embodiments of the present disclosure.

As shown in FIG. 3, in some embodiments light detectors 30 are disposed on a side (or surface) of amplifier substrate 12 that is opposite (on an opposite or opposing side) from a side (or surface) of amplifier substrate on which light emitters 20 are disposed. Thus, light detectors 30 are on an opposite side of amplifier substrate 12 than light emitters 20. In some such embodiments, amplifier substrate 12 need not be transparent. Wires 16 in different layers can be electrically connected through vias 19, as are used in the integrated circuit and printed circuit board industries. In such embodiments, light emitters 20 and light detectors 30 need not be interdigitated or interspersed in a direction parallel to the common surface and can be aligned, or not.

As shown in FIGS. 1B-3 detected (captured) light 60 and emitted light 60 can travel or propagate along a common, same direction.

Figure 4A:
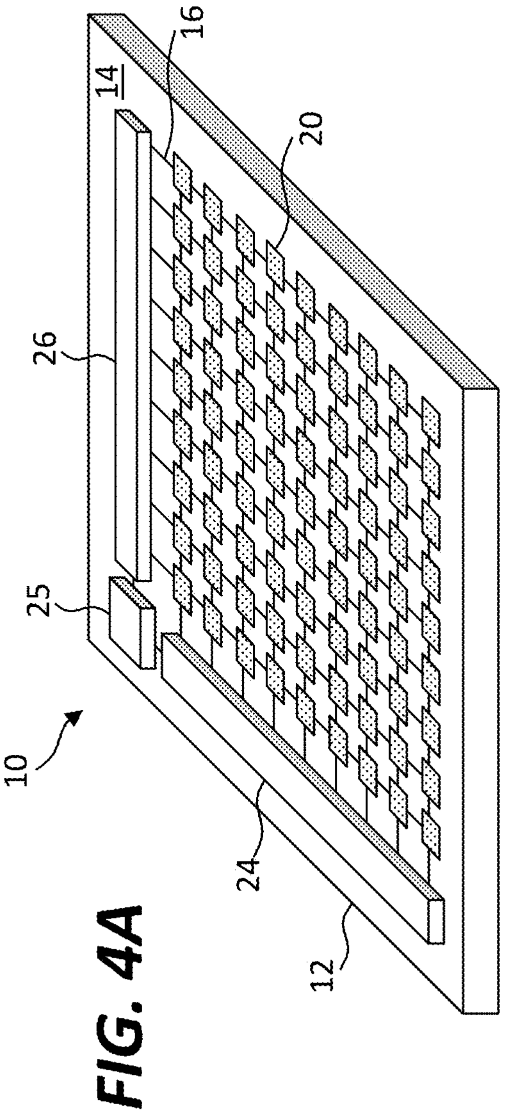
FIG. 4A is a perspective and top view of a display amplifier according to illustrative embodiments of the present disclosure.
Figure 4B:
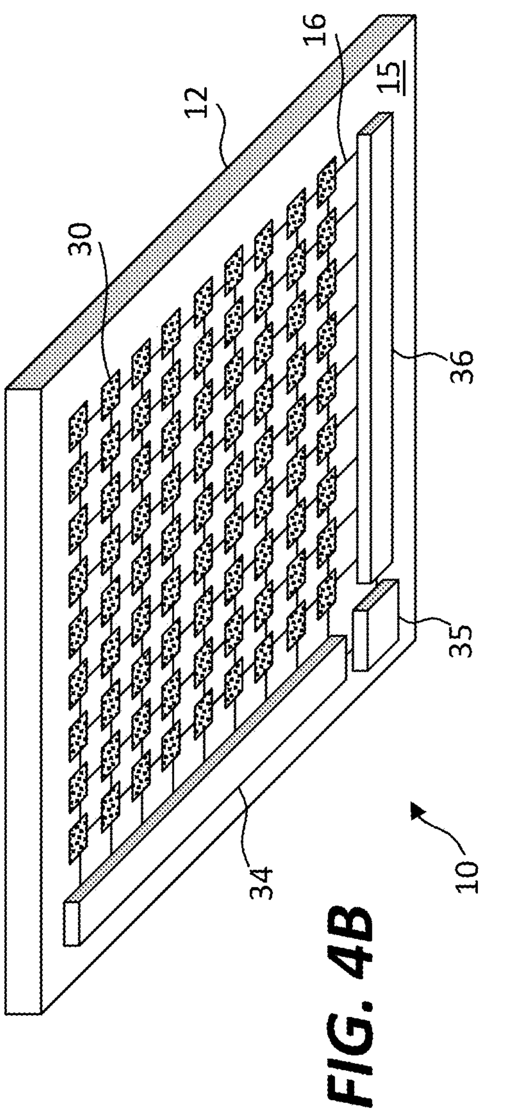
FIG. 4B is a perspective and bottom view of a display amplifier, for example the display amplifier of FIG. 4A, according to illustrative embodiments of the present disclosure.
Figure 4C:
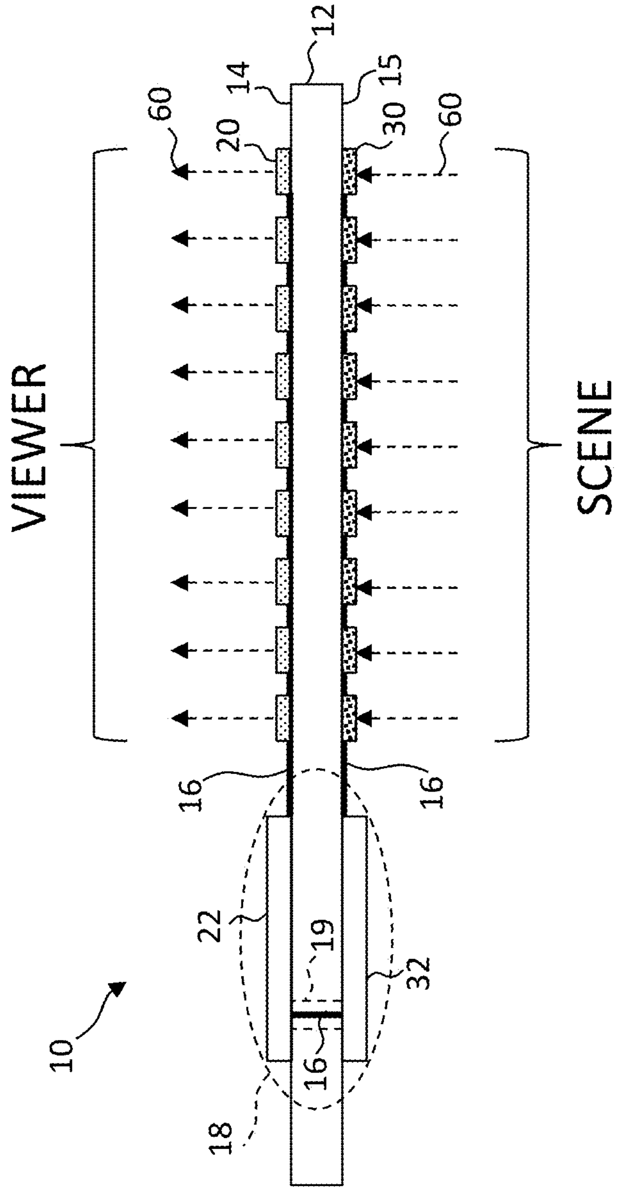
FIG. 4C is a cross section of a display amplifier, for example the display amplifier of FIGS. 4A and 4B, according to illustrative embodiments of the present disclosure.
Figure 5A:
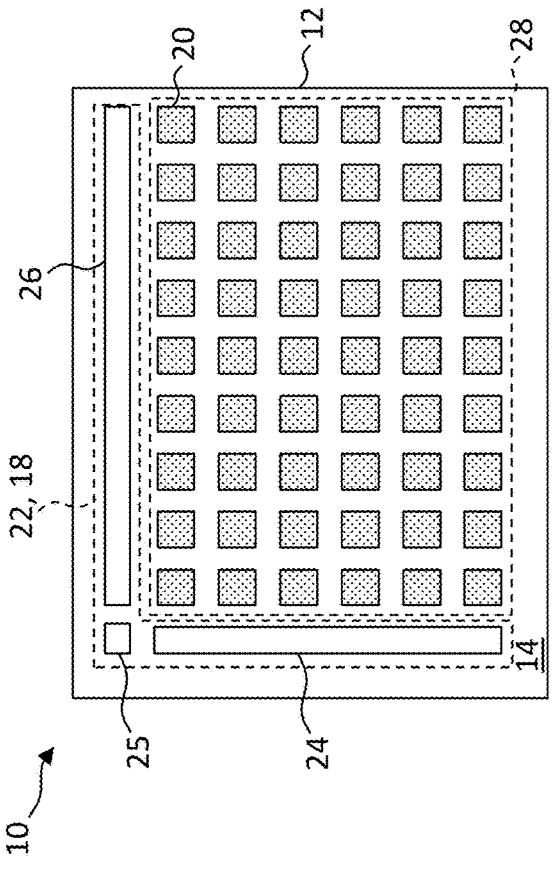
FIG. 5A is a top plan view of a display amplifier, for example the display amplifier of FIGS. 4A-4C, according to illustrative embodiments of the present disclosure.
Figure 5B:
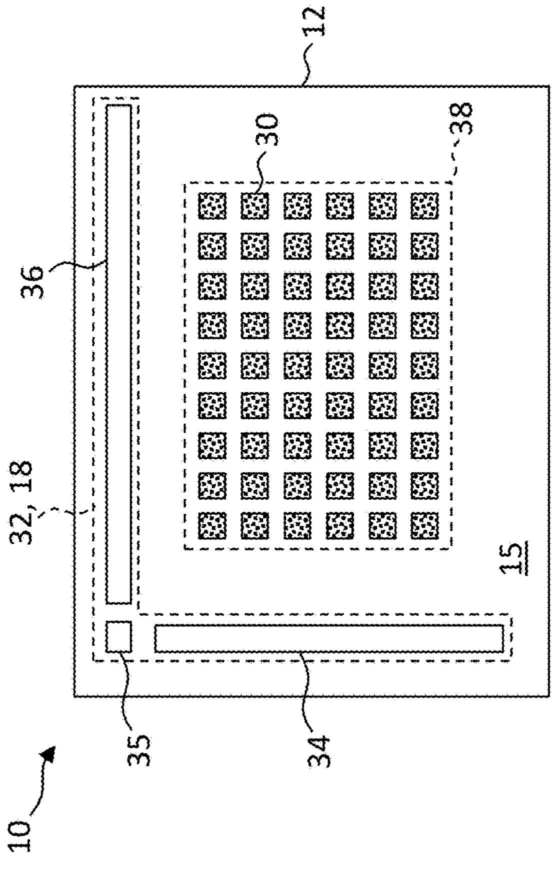
FIG. 5B is a bottom plan view of a display amplifier, for example the display amplifier of FIG. 5A, according to illustrative embodiments of the present disclosure.

According to embodiments of the present disclosure and as illustrated in the top and bottom perspectives of FIGS. 4A and 4B, the cross section of FIG. 4C, and the top and bottom plan views of FIGS. 5A and 5B as well as FIG. 3, a display amplifier 10 can comprise an amplifier substrate 12 having a detection side 15 opposed to an emission side 14. An array of light emitters 20 can be disposed on emission side 14 of amplifier substrate 12 and an array of light detectors 30 can be disposed on detection side 15 of amplifier substrate 12. An amplifier circuit 18 (shown in FIGS. 4C, 5A, 5B) can be operable to capture an image on detection side 15 using the array of light detectors 30 on detection side 15 and display the captured image using the array of light emitters 20 on emission side 14. Amplifier substrate 12 is the same, single, common substrate in all of FIGS. 4A-5B.

Amplifier circuit 18 can comprise one or more sub-circuits, e.g., integrated circuits disposed on either or both of emission side 14 and detection side 15 connected, for example, through a trans-substrate via 19 (e.g., an electrically conductive through-substrate via, as shown in FIG. 4C) or with electrical connections that wrap around amplifier substrate 12 (not shown in the Figures). Amplifier circuit 18 can comprise an emission row controller 24 for selecting rows of light emitters 20, an emission column-data controller 26 for providing data (e.g., pixel data in an image captured by light detectors 30) to columns of light emitters 20, and an emission controller 25 for receiving an image and controlling emission column-data controller 26 and emission row controller 24 to display the captured image with the array of light emitters 20. Emission row controller 24, emission controller 25, and emission column-data controller 26 can comprise an emission circuit 22. Emission circuit 22 and light emitters 20 can be considered as an amplifier display disposed on emission side 14 of amplifier substrate 12. In some embodiments, emission circuit 22 can, but does not necessarily, provide matrix-addressed control to light emitters 20, as illustrated in FIGS. 4A and 5A.

Similarly, amplifier circuit 18 can comprise a detection row controller 34 for selecting rows of light detectors 30, a detection column-data controller 36 for receiving image data (e.g., pixel data in an image) captured by columns of light detectors 30, and a detection controller 35 for controlling detection column-data controller 36 and detection row controller 34 to output or provide the captured image. Detection row controller 34, detection controller 35, and detection column-data controller 36 can comprise a detection circuit 32. Detection circuit 32 and light detectors 30 can be considered as an amplifier camera disposed on detection side 15 of amplifier substrate 12. In some embodiments, detection circuit 32 can, but does not necessarily, provide matrix-addressed control to light detectors 30, as illustrated in FIGS. 4B and 5B.

Detection controller 35 can electrically connect to emission controller 25 with wires 16 provided in trans-substrate vias 19 and either or both of detection controller 35 and emission controller 25 can comprise logic to capture an image with light detectors 30 and display the image using light emitters 20. Thus, light detectors 30 can act as a digital camera under the control of detection controller 35 and light emitters 20 can act as a display under the control of emission controller 25. Amplifier circuit 18 can comprise emission circuit 22 and detection circuit 32. In some embodiments, emission circuit 22 and detection circuit 32 can be on a common, same side of amplifier substrate 12, for example as shown in FIGS. 1A-2B. In some embodiments, emission circuit 22 and detection circuit 32 can be disposed in a common layer on amplifier substrate 12, for example as shown in FIGS. 1A-1C. In some embodiments, emission circuit 22 and detection circuit 32 can be disposed (stacked) in different layers on a common side or surface of amplifier substrate 12, for example as shown in FIGS. 2A-2B. In some embodiments, emission circuit 22 and detection circuit 32 can be disposed on different sides or surfaces of amplifier substrate 12, for example as shown in FIGS. 3-5B.

Any one or combination of emission row controller 24, emission controller 25, emission column-data controller 26, detection row controller 34, detection controller 35, and detection column-data controller 36 (*i*) can be formed in or on and native to amplifier substrate 12 (e.g., if amplifier substrate 12 comprises a photolithographically processed semiconductor substrate such as a silicon substrate) or (ii) can be disposed on and non-native to amplifier substrate 12 (e.g., if amplifier substrate 12 comprises a dielectric substrate such as a fiber glass, glass, or polymer substrate) for example by micro-transfer printing, pick-and-place, or surface-mount technologies. Any one or combination of emission row controller 24, emission controller 25, emission column-data controller 26, detection row controller 34, detection controller 35, and detection column-data controller 36 can be electrically connected with wires 16 formed using photolithographic methods and materials found in the integrated circuit or printed-circuit-board industries. For clarity, wires 16 are not shown in FIGS. 5A and 5B.

Amplifier substrate 12 can be any suitable substrate such as those found in the printed-circuit board, display, or integrated-circuit industries, for example comprising, fiber glass, glass, polymer, or a semiconductor such as silicon and can be, for example, a printed-circuit board, glass or polymer substrate, a wafer (e.g., a semiconductor or glass wafer), or a portion of such a wafer. Display amplifier 10 can be readily visible to and physically handled by a human, for example using hands. Thus, an area of amplifier substrate 12 can be no less than four $cm^2$, no less than eight $cm^2$, no less than sixteen $cm^2$, no less than twenty four $cm^2$, no less than sixty four $cm^2$, no less than ninety six $cm^2$, no less than one hundred twenty eight $cm^2$, or no less than two hundred fifty six $cm^2$, or no less than six hundred twenty five $cm^2$.

In some embodiments, amplifier substrate 12 can comprise multiple (for example two) layers, for example layers laminated together, comprising one or more different or same materials. Light emitters 20 can be a light-emitting or light-controlling device, for example a light-emitting diode such as an inorganic light-emitting diode and can comprise a compound semiconductor. Light emitters 20 can comprise inorganic micro-light-emitting diodes, inorganic diode lasers, or vertical cavity surface emission lasers (VCSELs) non-native to and disposed on amplifier substrate 12 using micro-transfer printing. Light detectors 30 can be a light-detecting device, for example a photodiode or phototransistor. Light detectors 30 can comprise inorganic micro-photodiodes native to amplifier substrate 12 or non-native to and disposed on amplifier substrate 12, for example by micro-transfer printing. Amplifier circuit 18 can be one or more integrated circuits any one or more of which can be native to amplifier substrate 12 (e.g., formed in or on a semiconductor amplifier substrate 12 using integrated-circuit processing methods and materials) or can be non-native to and disposed on a dielectric amplifier substrate 12 (such as glass), for example by micro-transfer printing, pick-and-place techniques, or using surface-mount technologies. Any one or more of light emitters 20, light detectors 30, or amplifier circuit 18 can be assembled on amplifier substrate 12 by micro-transfer printing and can comprise a broken (e.g., fractured) or separated tether 90. Such small micro-transfer-printed devices can provide high-resolution image detection or display.

In some embodiments, and as shown in FIGS. 5A and 5B, a detection area 38 of detection side 15 (e.g., an image capture area formed by a convex hull around light detectors 30) has a same area as an emission area 28 of emission side 14 (e.g., an image display area a formed by a convex hull around light emitters 20). In some embodiments, detection area 38 and emission area 28 are different, for example detection area 38 can be smaller or larger than emission area 28, such as within a range of from 98% to 102%, within a range of from 95% to 105%, within a range of from 90% to 110% of emission area 28, within a range of from 80% to 120% of emission area 28, within a range of from 50% to 150% of emission area 28. In embodiments, detection area 38 is smaller than emission area 28 and emission area 28 serves to enlarge and display an image detected by light detectors 30. FIGS. 5A and 5B illustrate a detection area 38 smaller than an emission area 28.

Figure 6:
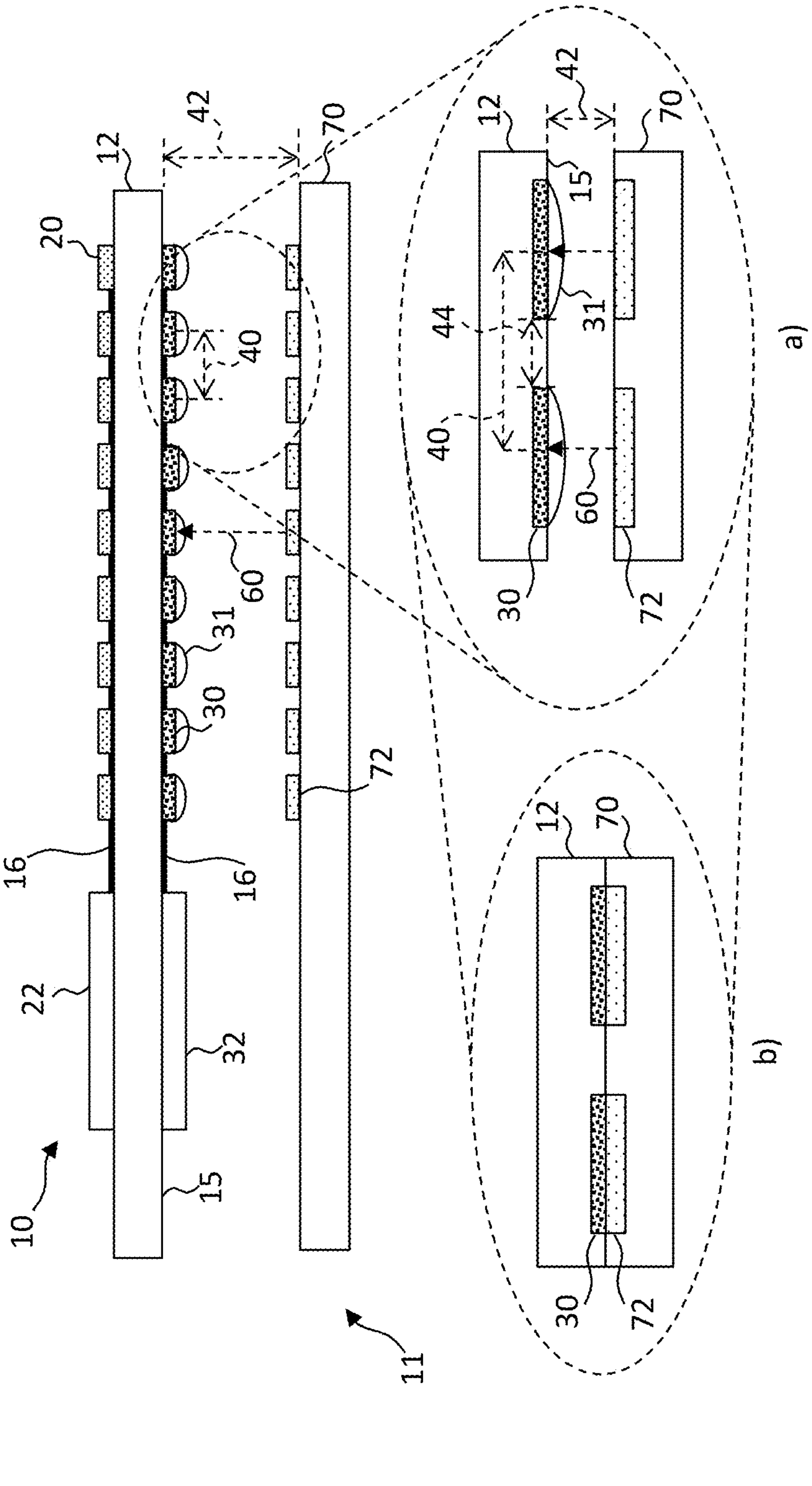
FIG. 6 is a cross section with inset enlargements of a display amplifier system according to illustrative embodiments of the present disclosure.

As shown in FIG. 4C, light detectors 30 are exposed to a real-world scene that is exposed directly onto the array of light detectors 30 so that each light detector 30 receives light rays (light 60) from substantially all portions of the scene. In some embodiments, the real-world scene is not imaged onto the array of light detectors 30, for example with an optical system. Therefore, to provide a coherent image to light detectors 30, the real-world scene or a reproduction of a real-world scene can be disposed very close to detection side 15 so that different portions of the scene emitting or reflecting different light rays (different light 60) are exposed only to different light detectors 30, as shown in FIG. 6. This can be accomplished, for example, by disposing detection side 15 of display amplifier 10 in close proximity (inset a) or in substantial contact (inset b) with a plane on which is located the scene. For example, detection side 15 can be disposed on, e.g., directly on, a sheet of paper, a surface, or a scene display 70 separate and independent from display amplifier 10 and amplifier substrate 12 bearing an image or showing an image, for example to a viewer or other user. In all of these cases, different light 60 from different portions of the scene (the image) is detected by different light detectors 30, thereby forming a coherent image detected by the array of light detectors 30 on detection side 15 and displayed with the array of light emitters 20 on emission side 14 of a common amplifier substrate 12.

FIG. 6 illustrates the use of lenslets 31 that can optically image scene information (pixels) on light detectors 30. Imaging optics can comprise a lenslet array (e.g., an individual lens for each light detector 30 as shown in inset a) or an optical structure (e.g., one or more lenses) disposed between the scene (e.g., scene display 70 or scene-display pixels 72) and light detectors 30. Lenslets 31 can be disposed on light detectors 30 by molding, ink jet printing, or laminating a sheet comprising lenslets 31 over light detectors 30. If scene display 70 is in contact with display amplifier 10, lenses or lenslets can be unnecessary (as shown in inset b)

As shown in FIG. 6, each light detector 30 can be disposed on detection side 15 at a light-detector pitch 40 greater than an extent of light detectors 30 (and so spatially separated from a neighboring light detector 30) in a direction. The scene can be disposed no more than a distance 42 equal to the light-detector pitch 40 from detection side 15 of amplifier substrate 12 or the scene can be disposed no more than a distance 42 equal to one half or one quarter of light-detector pitch 40 from detection side 15 of amplifier substrate 12. In some embodiments, light detectors 30 can be separated by a spacing 44 (e.g., a spatial separation distance) and the scene can be disposed no more than a distance 42 equal to spacing 44 from detection side 15 of amplifier substrate 12 or the scene can be disposed no more than a distance 42 equal to one half or one quarter of spacing 44 from detection side 15 of amplifier substrate 12, for example as shown in FIG. 6 inset a). In embodiments, the scene (e.g., information disposed on a plane, such as a flat-panel scene display 70) is disposed as close as possible (e.g., in substantial contact with so that distance 42 is zero or close to zero) to light detectors 30, so that light 60 from any one scene-display pixel 72 can only be detected by a single light detector 30 and each detected image pixel is separate from every other pixel, thus providing a coherent image for display by display amplifier 10, for example as shown in FIG. 6 inset b) and in more detail as shown in FIG. 7.

Figure 7:
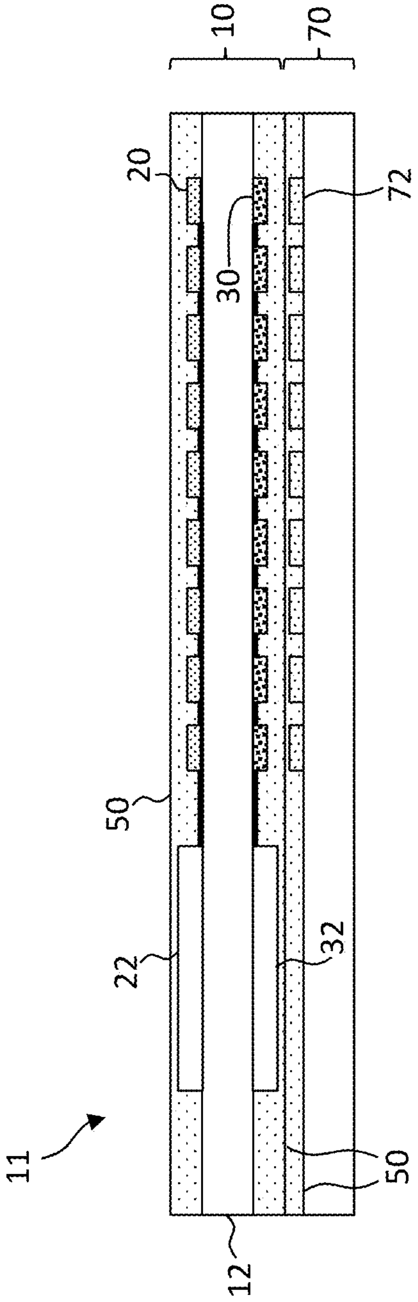
FIG. 7 is a cross section of a display amplifier system according to illustrative embodiments of the present disclosure.

FIG. 7 illustrates display amplifier 10 in substantial contact with scene display 70. Display amplifier 10 can comprise an encapsulating protective layer 50 (e.g., a cover) on each side of amplifier substrate 12 which prevents scene-display pixels 72 from directly contacting light detectors 30, but scene-display pixel 72 and light detector 30 pitch can be large enough relative to distance 42 from scene-display pixels 72 and light detectors 30 encapsulating protective layer 50 relatively thin enough to provide a sharp or coherent image to light detectors 30. Note that light detectors 30 and scene-display pixels 72 are not necessarily aligned with and do not necessarily have the same resolution or size. Thus, an image detected by the array of light detectors 30 in display amplifier 10 can be lower resolution than a scene displayed with scene-display pixels 72 of scene display 70. In some embodiments, scene display 70 is in contact with display amplifier 10 because protective layers 50 of either or both scene display 70 and display amplifier 10 are in contact.

Figure 8:
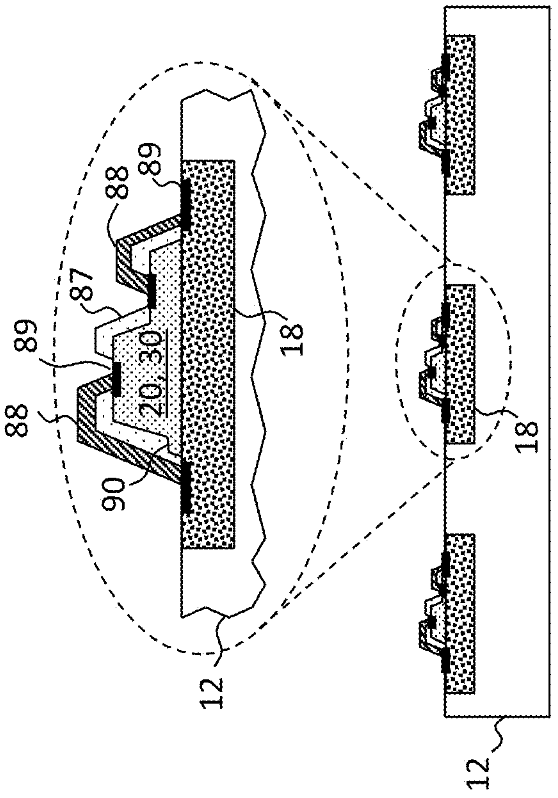
FIG. 8 is a cross section and inset enlargement of a micro-transfer-printed light detector, light emitter, or amplifier circuit in a display amplifier according to illustrative embodiments of the present disclosure.

As illustrated in FIG. 8 and in some embodiments of the present disclosure, a light detector 30, light emitter 20, or amplifier circuit 18 can be a bare, unpackaged integrated circuit formed on a source substrate and micro-transfer printed onto amplifier substrate 12, so that the integrated circuit comprises a fracture (e.g., broken) or separated tether 90. The printed integrated circuit can comprise electrical contact pads 89 and can be pattern-wise coated with a dielectric structure 87 to insulate the bare integrated circuit, exposing the electrical contact pads 89. The contact pads 89 can be electrically connected with electrodes 88 to amplifier circuit 18 (e.g., wires 16) using photolithographic methods and materials.

Amplifier circuit 18 can comprise one or more integrated circuits non-native to and disposed on one or more sides of amplifier substrate 12 (as shown in FIGS. 4A-7), for example by micro-transfer printing, or can comprise one or more integrated circuits native to and formed in or on one or more sides of amplifier substrate 12 (as shown in FIG. 8), for example using photolithographic methods and materials in a semiconductor amplifier substrate 12. In some embodiments, amplifier substrate 12 can comprise a semiconductor comprising silicon (e.g., a silicon wafer or portion thereof) and light detectors 30 can be native to amplifier substrate 12 (as well as one or more of amplifier circuit 18 integrated circuits). In some embodiments, light detectors 30 are formed in common on a camera substrate (e.g., a semiconductor substrate) that is mounted on detection side 15 of amplifier substrate 12 and electrically connected to amplifier circuit 18 with electrodes 88 and wires 16. In some embodiments, light emitters 20 are formed in common on a display substrate (e.g., a semiconductor substrate or compound semiconductor substrate) that is mounted on emission side 14 of amplifier substrate 12 and electrically connected to amplifier circuit 18 with electrodes 88 and wires 16.

In embodiments in which scene display 70 does not emit light 60 (e.g., with a reflective scene display 70) or the scene is not otherwise illuminated, (e.g., as with a sheet of paper or other physical surface), display amplifier 10 can comprise an illuminator (e.g., one or more LEDs) disposed on detection side 15 operable to illuminate the scene. Display amplifier 10 can comprise a brightness control operable to control the brightness of light emitters 20, for example controlled by emission circuit 22. In some embodiments, display amplifier 10 can comprise a gain control operable to control the sensitivity of light detectors 30 or operable to control the brightness of light emitters 20, for example in response to ambient scene illumination on light detectors 30 or light emitters 20, and controlled by detection circuit 32. In some embodiments, in addition to providing a brighter view of the scene with the array of light emitters 20, light detectors 30 can comprise color-detection pixels (e.g., light detectors 30 responsive to colors), light emitters 20 can comprise color light-emission pixels (e.g., light emitters 20 that emit colors of light 60). The colors of light 60 emitted by light emitters 20 can be more or less saturated than the colors of light 60 detected by light detectors 30, for example color-adjusted under the control of amplifier circuit 18.

Figure 9:
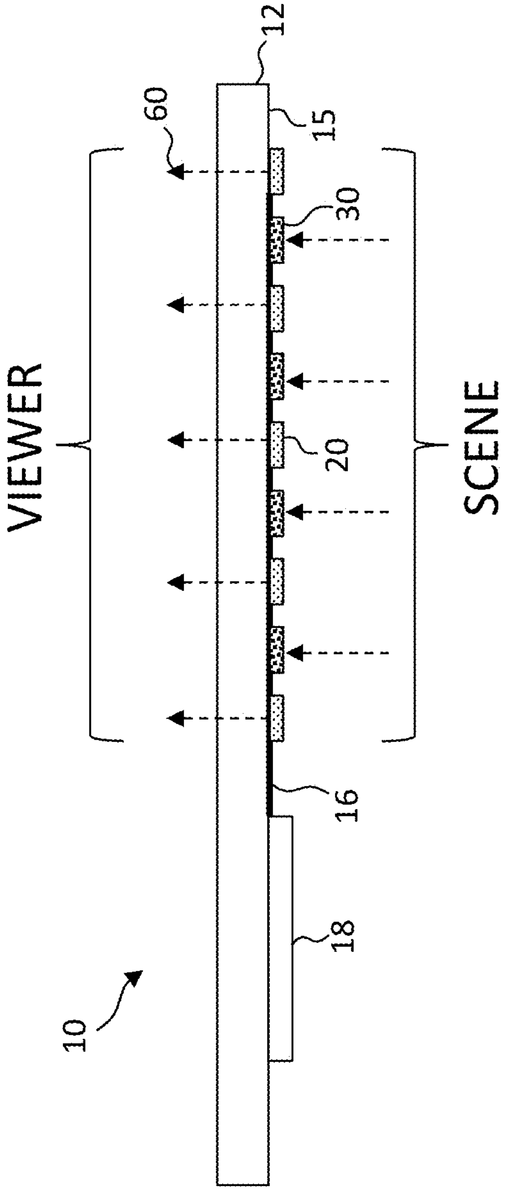
FIG. 9 is a cross section of a display amplifier having light detectors and light emitters disposed on a common side of an amplifier substrate according to illustrative embodiments of the present disclosure.

In some embodiments of the present disclosure and as illustrated in FIG. 9, a display amplifier 10 comprises a transparent amplifier substrate 12 having a detection side 15, an array of light detectors 30 disposed on detection side 15 operable to detect light 60 from a scene, an array of light emitters 20 disposed on detection side 15 operable to emit light 60 through transparent amplifier substrate 12, and an amplifier circuit 18 operable to capture an image using the array of light detectors 30 and display the captured image using the array of light emitters 20. In embodiments, light emitters 20 are interspersed or interdigitated between light detectors 30 on common detection side 15. Such a configuration can be simpler to construct as processing can be necessary on only one side of amplifier substrate 12. By disposing light emitters 20 and light detectors 30 on detection side 15 (rather than on emission side 14), light detectors can be disposed closer to the scene and therefore record a sharper, more coherent, image of the scene.

In some embodiments and as shown in FIG. 1B, a display amplifier 10 comprises a transparent amplifier substrate 12 having an emission side 14, an array of light detectors 30 disposed on emission side 14 operable to detect light 60 transmitted through the transparent amplifier substrate 12 from a scene, an array of light emitters 20 disposed on emission side 14 operable to emit light 60 away from the transparent amplifier substrate 12, and an amplifier circuit 18 operable to capture an image using the array of light detectors 30 and display the captured image using the array of light emitters 20. In embodiments, light emitters 20 are interspersed or interdigitated between light detectors 30 on emission side 14. Such a configuration can be simpler to construct as processing can be necessary on only one side of amplifier substrate 12.

Embodiments of the present disclosure can be constructed by first disposing emission circuit 22 and light emitters 20 on emission side 14 of amplifier substrate 12 and then forming wires 16 (as well as any dielectric structures 87, electrodes 88, and contact pads 89) electrically connecting any integrated circuits in emission circuit 22 and light emitters 20. Second, detection circuit 32 and light detectors 30 can be disposed on detection side 15 of amplifier substrate 12 and then forming wires 16 (as well as any dielectric structures 87, electrodes 88, and contact pads 89) electrically connecting any integrated circuits in detection circuit 32 and light detectors 30. Any trans-substrate vias 19 can be formed before or after the first and second steps. The first and second steps can be reversed.

Embodiments of the present disclosure can be constructed by disposing emission circuit 22, light emitters 20, detection circuit 32, and light detectors 30 on emission side 14 or detection side 15 of amplifier substrate 12 and then forming wires 16 (as well as any dielectric structures 87, electrodes 88, and contact pads 89) electrically connecting any integrated circuits in emission circuit 22, light emitters 20, detection circuit 32, and light detectors 30 (as well as any dielectric structures 87, electrodes 88, and contact pads 89) electrically connecting any integrated circuits in emission circuit 22, light emitters 20, detection circuit 32, and light detectors 30. Any trans-substrate vias 19 can be formed before or after the first and second steps.

Figure 10:
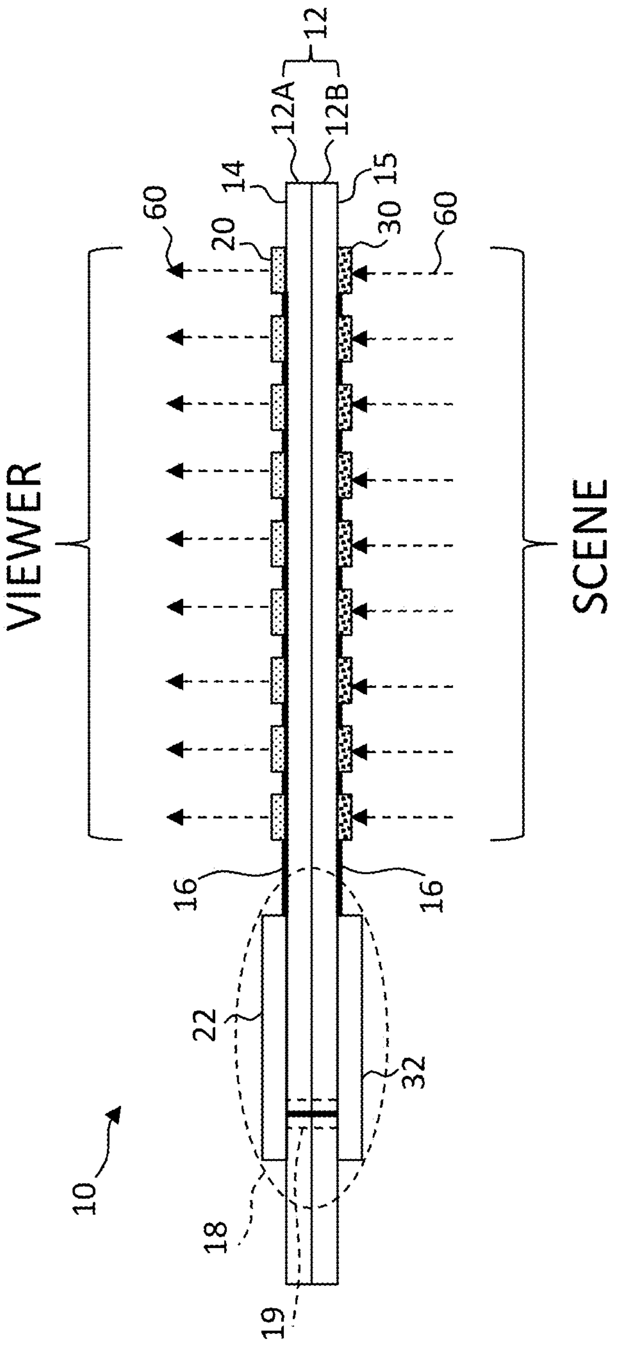
FIG. 10 is a cross section of a display amplifier comprising a bi-layer laminated amplifier substrate according to illustrative embodiments of the present disclosure.

In some embodiments of the present disclosure and as illustrated in FIG. 10, emission circuit 22 and light emitters 20 can be disposed on and electrically connected on an emission side 14 of an emitter substrate 12A. Detection circuit 32 and light detectors 30 can be disposed on and electrically connected on a detection side 15 of a detector substrate 12B separate from emitter substrate 12A. The side of detector substrate 12B opposite emission side 14 is then laminated to the side of detector substrate 12B opposite detection side 15 to form amplifier substrate 12. Any wires 16 provided through trans-substrate vias 19 can then be formed in amplifier substrate 12 to electrically connect emission circuit 22 and detection circuit 32, thereby constructing display amplifier 10.

As shown in FIG. 6, embodiments of the present disclosure can comprise a display amplifier system 11 comprising a display amplifier 10 and a scene display 70 separate from display amplifier 10 having a scene-display substrate different from amplifier substrate 12. In embodiments, scene display 70 is disposed no greater than twenty millimeters from detection side 15, no greater than ten millimeters from detection side 15, no greater than five millimeters from detection side 15, no greater than two millimeters from detection side 15, no greater than one millimeter from detection side 15, no greater than five hundred microns from detection side 15, no greater than two hundred fifty microns from detection side 15, no greater than one hundred microns from detection side 15, no greater than fifty microns from detection side 15, or in contact with detection side 15 or any layers disposed on detection side 15.

In some embodiments, scene display 70 is a liquid crystal display (LCD). In embodiments, the array of light emitters 20 is brighter than the LCD and can comprise inorganic micro-light-emitting diodes. In some embodiments, a resolution of the array of light detectors 30 is less than a resolution of the LCD. In some embodiments, an area of the array of light detectors 30 is less than an area of the array of light emitters 20.

Figure 11:
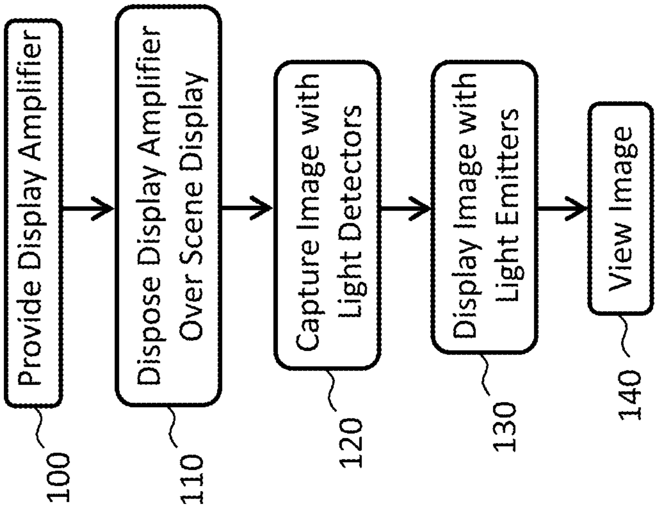
FIG. 11 is a flow diagram according to illustrative embodiments of the present disclosure.

In some embodiments and as illustrated in FIG. 11, a method of operating a display amplifier 10 can comprise providing display amplifier 10 in step 100, disposing display amplifier 10 over a scene display 70 (or other substantially planar image such as a sheet of paper) in step 110, optionally illuminating scene display 70, for example with an illuminator such as one or more light-emitting diodes on detection side 15, receiving a scene with light detectors 30 to form a captured image in step 120 using detection circuit 32, and displaying the captured image with light emitters 20 using emission circuit 22 in step 130. A viewer or user of display amplifier 10 can then view the displayed image in step 140. In embodiments, the image displayed by display amplifier 10 is brighter than, optionally enlarged or more color saturated than, and easier to see than the scene disposed on scene display 70.

In some embodiments of the present disclosure, display amplifier 10 can comprise color filters 72R, 72G, and 72B disposed on amplifier substrate 12 operable to filter light incident on ones of the light detectors 30, thus light detectors 30 can be operable to capture a color image. Color filters 72R, 72G, and 72B can filter red, green, and blue light respectively and can be disposed on a side of amplifier substrate 12 opposite light detectors 30 (as shown in FIG. 9) or can be disposed between amplifier substrate 12 and light detectors 30 (not shown in FIG. 12). Light emitters 20 can emit different colors of light, for example red, green, and blue light corresponding to the colors of light captured by light detectors 30 through color filters 72R, 72G, and 72B to emit an amplified, brighter, color image.

Figure 12:
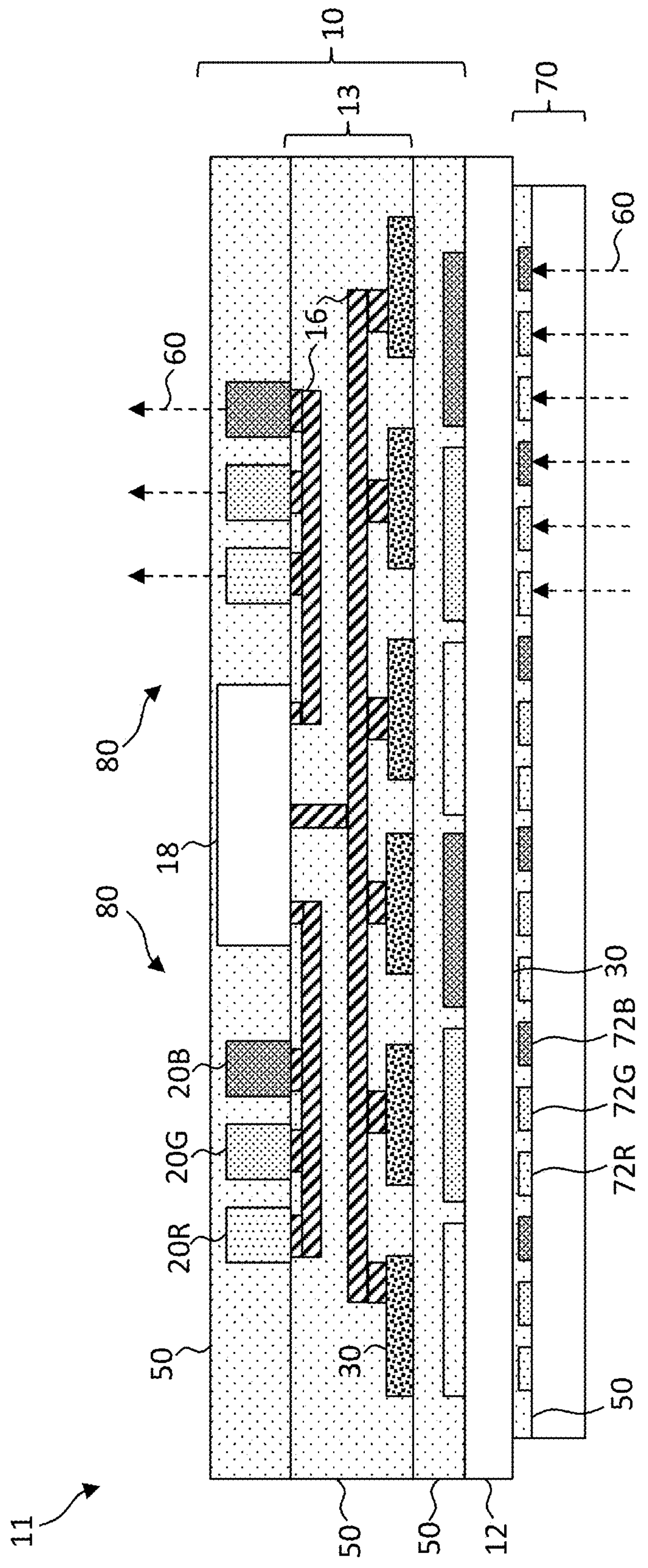
FIG. 12 is a cross section of a display amplifier system comprising color filters according to illustrative embodiments of the present disclosure.

Both light emitters 20 and light detectors 30 can be electrically connected to amplifier circuit 18 through wires 16. As shown in FIG. 12, wires 16 for light emitters 20 and light detectors 30 are formed in different metal layers separated by dielectric material in a metal-and-dielectric layer 13 with through-layer vias 19 (e.g., as in FIG. 10) for wires 16 and can represent a bus (e.g., multiple separate wires 16, not separately shown in FIG. 12 for clarity and illustrative simplicity).

In some embodiments of the present disclosure and as shown in FIGS. 12-16, amplifier circuit 18 comprises multiple distributed amplifier circuits 18. Each distributed amplifier circuit 18 is connected to one or more light detectors 30 and one or more light emitters 20 but is connected to less than all of light detectors 30 and less than all of light emitters 20. Each light emitter 20 connected to a distributed amplifier circuit 18 can be controlled by distributed amplifier circuit 18 to emit light corresponding to light captured by a spatially corresponding light detector 30 connected to the distributed amplifier circuit 18. Spatially corresponding light detectors 30 and light emitters 20 are disposed in relatively the same position in a scene image captured by light detectors 30. Distributed amplifier circuit 18 can be an electronic circuit responsive to light detectors 30 connected to distributed amplifier circuit 18 to control light emitters 20 to emit light corresponding to light captured by light detectors 30. Each light emitter 20 responsive to a corresponding light detector 30 together with control circuitry in distributed amplifier circuit 18 can be an amplifier pixel 80. In contrast, each non-distributed amplifier circuit 18 such as is illustrated in FIGS. 1A-10 control all of light emitters 20 and light detectors 30, for example one row or column at a time. Each distributed amplifier circuit 18 controls only a subset (group or cluster) of light emitters 20 and light detectors 30 and can control them directly or using a matrix-address control method In embodiments, each distributed amplifier circuit 18 can be connected to one (e.g., only one) light emitter 20 and one (e.g., only one) light detector 30. In some embodiments, each distributed amplifier circuit 18 can be connected to two (e.g., only two) light emitters 20 and two (e.g., only two) light detectors 30. In some embodiments, each distributed amplifier circuit 18 can be connected to four (e.g., only four) light emitters 20 and four (e.g., only four) light detectors 30. In some embodiments, each distributed amplifier circuit 18 can be connected to six (e.g., only six) light emitters 20 and six (e.g., only six) light detectors 30. In some embodiments, each distributed amplifier circuit 18 can be connected to eight (e.g., only eight) light emitters 20 and eight (e.g., only eight) light detectors 30. In some embodiments, each distributed amplifier circuit 18 can be connected to nine, twelve, sixteen, twenty four, thirty two, forty eight, or sixty four (e.g., only nine, twelve, sixteen, twenty four, thirty two, forty eight, or sixty four) light emitters 20 and nine, twelve, sixteen, twenty four, thirty two, forty eight, or sixty four (e.g., only nine, twelve, sixteen, twenty four, thirty two, forty eight, or sixty four) light detectors 30. A distributed amplifier circuit 18 can be connected to the same number of light emitters 20 as light detectors 30. A distributed amplifier circuit 18 can be connected to more light emitters 20 than light detectors 30. A distributed amplifier circuit 18 can be connected to fewer light emitters 20 than light detectors 30. In embodiments, light emitters 20 and light detectors 30 connected to a common distributed amplifier circuit 18 are adjacent neighbors and can be local (e.g., adjacent to) the common distributed amplifier circuit 18. Light emitters 20 that are adjacent neighbors can be light emitters 20 between which there are no other light emitters 20 that are not connected to the common distributed amplifier circuit 18. Light detectors 30 that are adjacent neighbors can be light detectors 30 between which there are no other light detectors 30 that are not connected to the common distributed amplifier circuit 18.

Light emitters 20 connected to common distributed amplifier circuits 18 can form mutually exclusive groups (e.g., proper subsets or clusters) of light emitters 20. Similarly, light detectors 30 connected to common distributed amplifier circuits 18 can form mutually exclusive groups (e.g., proper subsets) of light detectors 30. Light emitters 20 and light detectors 30 in a common group (e.g., connected to a common distributed amplifier circuit 18) can be stacked (e.g., as shown in FIGS. 2A to 4C) in layers on a side of amplifier substrate 12 (e.g., as shown in FIGS. 2A, 2B, and 12) or in layers on opposite sides of amplifier substrate 12 (e.g., as shown in FIGS. 3 and 4C). In some embodiments, light emitters 20 and light detectors 30 in a common group (e.g., connected to a common distributed amplifier circuit 18) can be interdigitated or interspersed in a common layer (e.g., as shown in FIGS. 1B, 1C, 9).

Each distributed amplifier circuit 18 can be an individual separate, and independent amplifier circuit 18 and, in embodiments, is not connected to any other distributed amplifier circuit 18 (e.g., to communicate signals or receive or transmit signals from or to a common wire 16 or external circuit). In embodiments, light emitters 20, light detectors 30, and distributed amplifier circuits 18 are connected in common to a power or ground source but no information is communicated between distributed amplifier circuits 18 or to any external display amplifier controller or other communication or computation circuits and therefore light emitters 20, light detectors 30, and distributed amplifier circuits 18 in each amplifier circuit 80 can be individual separate, and independent amplifier circuits 80 from any other amplifier circuit 80.

In embodiments of the present disclosure, by using distributed amplifier circuits 18 each connected only (except for power and ground sources) to a local subset of adjacent light emitters 20 and light detectors 30, information and control signals do not need to be communicated over amplifier substrate 12, the number or length of wires 16 routed on amplifier substrate 12 can be reduced, signal communication and control of light emitters 20 and light detectors 30 in the mutually exclusive groups can be improved, power use can be reduced, and frame rates (because higher frequency signals can be transmitted with less power over shorter distances) can be improved. Furthermore, external control circuits such as emission row controller 24, emission controller 25, and emission column-data controller 26 (e.g., emission circuit 22), and as detection row controller 34, detection controller 35, and detection column-data controller 36 (e.g., detection circuit 32) connected by wires 16 to light emitters 20 or light detectors 32 are rendered unnecessary, saving materials and processing cost, and enabling higher resolution as fewer long wires 16 are necessary over or on amplifier substrate 12.

FIG. 12 illustrates embodiments of a display amplifier system 11 comprising a display amplifier 10 and a color scene display 70. Display amplifier 10 has a distributed amplifier circuit 18 connected to and controlling two each of red, green, and blue light emitters 20 and two each of red, green, and blue light detectors 30. Light emitters 20 and light detectors 30 are disposed in an overlapping stack on a side of amplifier substrate 12. Display amplifier 10 captures light emitted by red, green, and blue scene-display pixels 72 using light detectors 30 and emits red, green, and blue light from light emitters 20 corresponding to scene-display pixels 72 in luminance and relative spatial location.

Figure 13A:
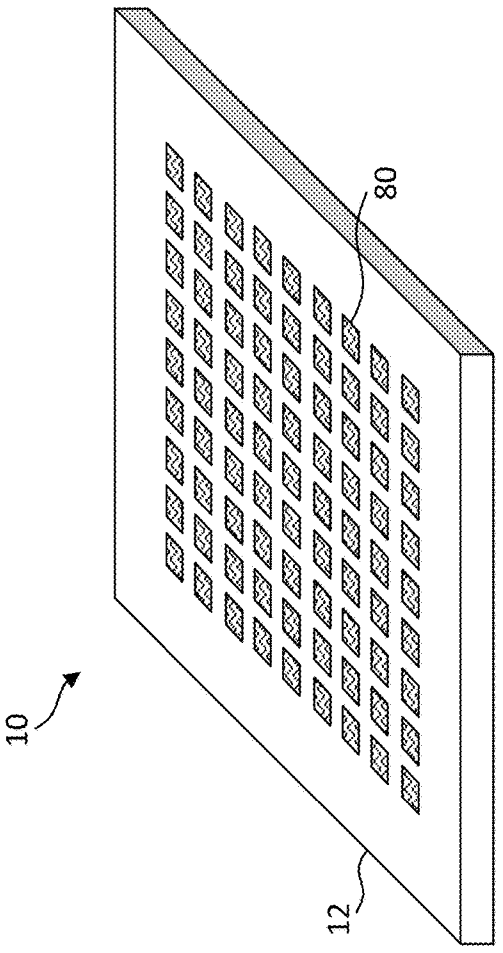
FIG. 13A is a perspective of a display amplifier system comprising a distributed amplifier circuit according to illustrative embodiments of the present disclosure.
Figure 13B:
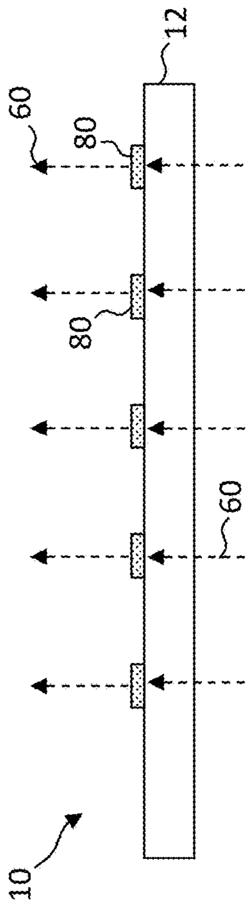
FIG. 13B is a cross section of a display amplifier system corresponding to FIG. 13A according to illustrative embodiments of the present disclosure.

FIG. 13A is a perspective and FIG. 13B is a cross section corresponding to FIG. 13A illustrating a display amplifier 10 comprising an array of amplifier pixels 80. Amplifier pixels 80 are not connected together (except by power and ground lines that do not communicate information; power and ground lines are not shown in FIGS. 13A, 13B).

Figure 14:
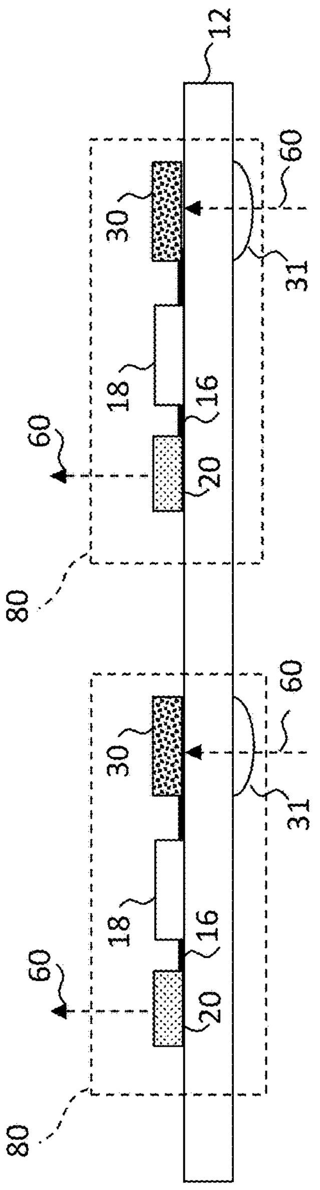
FIG. 14 is a cross section of a display amplifier system comprising a distributed amplifier circuit having light detectors and light emitters on a common side of an amplifier substrate according to illustrative embodiments of the present disclosure.
Figure 15:
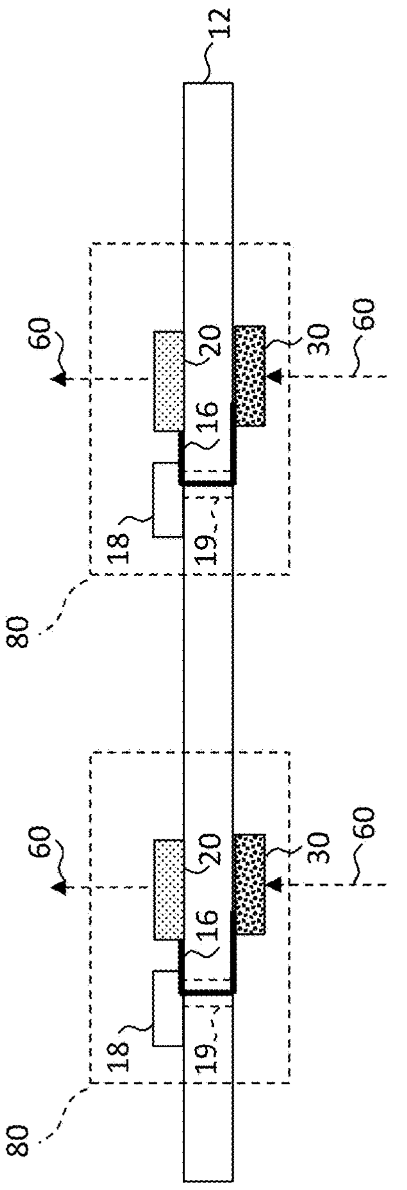
FIG. 15 is a cross section of a display amplifier system comprising a distributed amplifier circuit having light detectors and light emitters on opposite sides of an amplifier substrate according to illustrative embodiments of the present disclosure.

FIG. 14 is a cross section illustrating two amplifier pixels 80 in a common layer on a common side of amplifier substrate 12 each having a single light detector 30 and light emitter 20 connected to a common distributed amplifier circuit 18 with one or more wires 16. In such embodiments, light emitters 20 and light detectors 30 in amplifier pixels 180 can be interdigitated or interspersed in a layer on amplifier substrate 12. Each distributed amplifier circuit 18 can comprise an electronic circuit operable to respond to light captured by light detector 30 and control light emitter 20 to emit light corresponding to captured light 60. FIG. 15 illustrates embodiments in which light emitter 20 and light detector 30 in amplifier pixels 80 are disposed in a stack on opposite sides of amplifier substrate 12 and electrically connected with wires (e.g., electrical connections) 16 that pass through a trans-substrate via 19.

Figure 16:
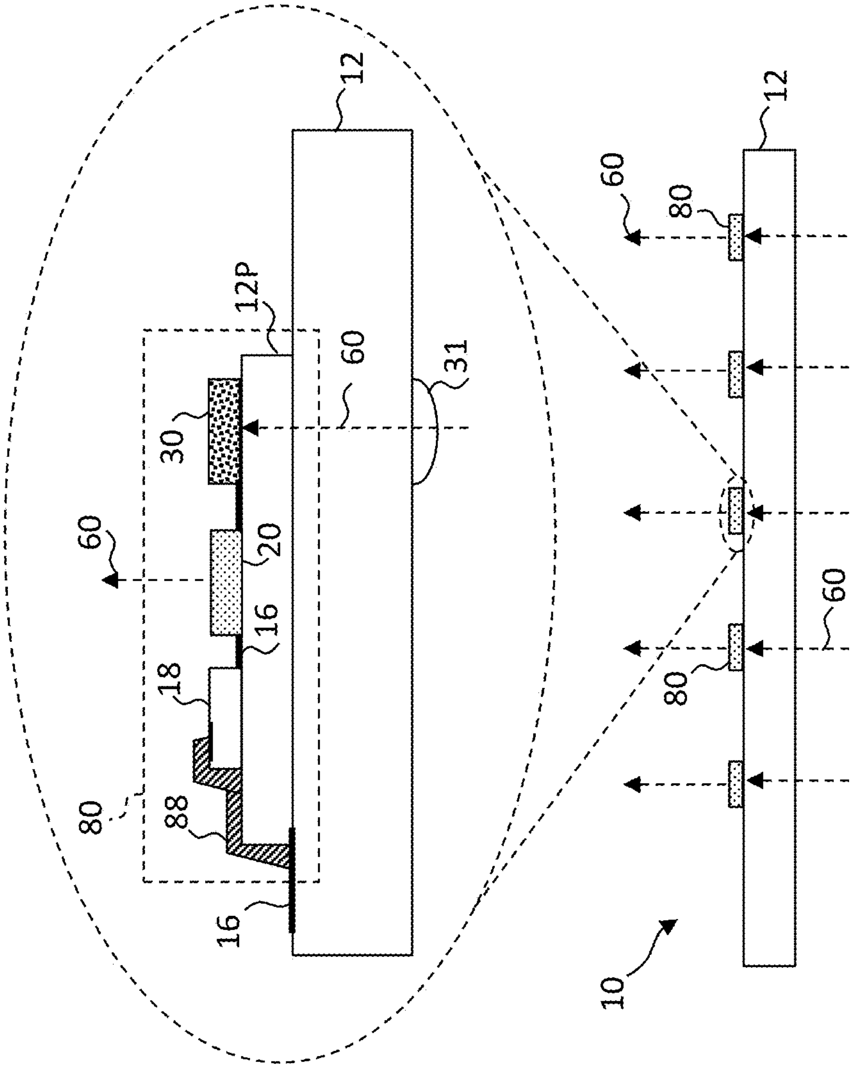
FIG. 16 is a cross section of a display amplifier system comprising a distributed amplifier circuit with an inset detail having light detectors and light emitters on a common side of pixel substrate disposed on an amplifier substrate according to illustrative embodiments of the present disclosure.

FIG. 16 illustrates embodiments in which amplifier pixels 80 are disposed on an amplifier pixel substrate 12P (for example comprising glass or a semiconductor such as silicon). Amplifier pixel substrate 12P can be mounted on amplifier substrate 12 and connected to power and ground sources (not shown in FIG. 16) with wires 16 (e.g., formed by photolithographic thin-film interconnect methods). Distributed amplifier circuit 18 can be formed in amplifier pixel substrate 12P (if amplifier pixel substrate 12P is a semiconductor) or disposed on amplifier pixel substrate 12P, for example as an unpackaged bare die micro-transfer printed onto amplifier pixel substrate 12P and comprising a fractured or separated tether 90). Similarly, light emitter 20 and light detector 30 can be disposed on amplifier pixel substrate 12P by micro-transfer printing). Micro-transfer printing generally provides a method for heterogeneous device micro-assembly that can enable a high amplifier pixel resolution in display amplifier 10. Embodiments such as those shown in FIG. 16 can provide amplifier pixels 80 that can be tested prior to disposition on amplifier substrate 12, thus increasing resolution for display amplifier 10. Multiple amplifier pixels 80 can be disposed on a common amplifier pixel substrate 12P.

Light emitters 20 of the present disclosure can be inorganic light-emitting diodes (LEDs), diode laser, vertical-cavity surface-emitting lasers (VCSELs), or lasers micro-transfer printed from a source wafer onto emission side 14 and can therefore be very bright, be very small, be very power-efficient, and have an excellent resolution. As such, the light emitters 20 can comprise fractured or separated tethers 90 as a consequence of micro-transfer printing.

Having described certain implementations of embodiments, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific elements, or where processes and methods are described as having, including, or comprising specific steps, it is contemplated that, additionally, there are apparatus and systems of the disclosed technology that consist essentially of, or consist of, the recited elements, and that there are processes and methods according to the disclosed technology that consist essentially of, or consist of, the recited processing steps.

It should be understood that the order of steps or order for performing certain action is immaterial so long as operability is not lost. Moreover, two or more steps or actions may be conducted simultaneously. As is understood by those skilled in the art, the terms “over”, “under”, “above”, “below”, “beneath”, and “on” are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between. In some embodiments of the present disclosure, an element disposed on a structure is an element disposed on (e.g., directly on) an intermediate structure that is on (e.g., directly on) the structure. For example, in some embodiments, a device disposed on a substrate is disposed on a layer on the substrate or on an intermediate structure or intermediate substrate that is disposed on the substrate.

It should be understood that the order of steps or order for performing certain action is immaterial so long as operability is maintained. Moreover, two or more steps or actions in some circumstances can be conducted simultaneously. The disclosure has been described in detail with particular reference to certain embodiments thereof, but it will be understood that variations and modifications can be effected within the spirit and scope of the disclosure.

PARTS LIST

10 display amplifier
11 display amplifier system
12 amplifier substrate
12A emitter substrate
12B detector substrate
12P amplifier pixel substrate
13 metal-and-dielectric layers
14 emission side
15 detection side
16 wire
18 amplifier circuit
19 via/trans-substrate via
20 light emitter
20R red light emitter
20G green light emitter
20B blue light emitter
22 emission circuit
24 emission row controller
25 emission controller
26 emission column-data controller
28 emission area
30 light detector
31 lenslet
32 detection circuit
34 detection row controller
35 detection controller
36 detection column-data controller
38 detection area
40 light-detector pitch
42 distance
44 light-detector spacing
50 protective layer
60 light
70 scene display
72 scene-display pixel
72R red color filter
72G green color filter
72B blue color filter
80 amplifier pixel
87 dielectric structure
88 electrode
89 contact pad
90 tether
100 provide display amplifier step
110 dispose display amplifier over display step
120 receive image with light detectors step
130 display image with light emitters step
140 view image step

What is claimed:

1. A display amplifier, comprising:

an amplifier substrate;

a detector array comprising a plurality of light detectors disposed on the amplifier substrate configured to receive incident light from a scene display device that is configured to display a display image by emitting incident light for each of a plurality of specified positions of the display image, wherein each of the plurality of light detectors is configured to receive, at a specified location on the detector array, the incident light corresponding to one or more of the specified positions of the display image and generate image data corresponding to the incident light received at each specified location;

an emitter array comprising a plurality of pixels each comprising one or more light emitters disposed on the amplifier substrate, wherein each of the pixels is configured to emit generated light from a corresponding location on the emitter array; and an amplifier circuit configured to:

receive the image data from the detector array of the plurality of light detectors for each of the specified locations, convert the image data to pixel data for each corresponding location of the plurality of pixels of the emitter array, wherein the pixel data for each pixel corresponds to the incident light received from one or more of the specified locations on the detector array and includes instructions for the generated light to be emitted at the pixel for each corresponding location on the emitter array, and control the plurality of pixels of the emitter array to emit the generated light according the pixel data for each pixel to display a reproduction of at least a portion of the display image using the emitter array.

2. The display amplifier of claim 1, wherein the amplifier substrate is at least partially transparent to the incident light received by the plurality of light detectors and wherein the detector array of the plurality of light detectors are disposed to receive the incident light through the amplifier substrate.

3. The display amplifier of claim 1, wherein the amplifier substrate is at least partially transparent to the generated light emitted by the light emitters and the emitter array of the plurality of pixels of the light emitters are disposed to emit the generated light through the amplifier substrate.

4. The display amplifier of claim 1, wherein the detector array of the plurality of light detectors is arranged to receive the incident light from a first direction and the emitter array of the plurality of pixels of the light emitters are arranged to emit the generated light in a second direction that is opposite to the first direction.

5. The display amplifier of claim 1, wherein the amplifier substrate has a first side and an opposing second side wherein the detector array of the plurality of the light detectors and the emitter array of the plurality of pixels of the light emitters are both disposed on the first side.

6. The display amplifier of claim 1, wherein the amplifier substrate has a first side and an opposing second side, wherein the emitter array of the plurality of pixels of the light emitters is disposed on the first side, and wherein the detector array of the plurality of light detectors is disposed on the second side.

7. The display amplifier of claim 1, wherein the amplifier substrate is planar in a first plane, and wherein the plurality of pixels of the light emitters and the plurality of light detectors are interdigitated or interspersed in a direction parallel to the first plane of the amplifier substrate.

8. The display amplifier of claim 1, wherein the the amplifier substrate is planar in a first plane, and wherein one or both of the light emitters of the emitter array and the light detectors of the detector array are at least partially stacked in layers in a direction orthogonal to the first plane.

9. The display amplifier of claim 1, further comprising a plurality of color filters disposed on the amplifier substrate such that the light on one or more of the plurality of light detectors is filtered by one or more of the color filters.

10. The display amplifier of claim 1, wherein the scene display device is spaced from the amplifier substrate by a separation distance, wherein the light detectors are disposed at a light-detector pitch separating centers of adjacent light detectors, wherein adjacent light detectors are separated by a light-detector spacing, and wherein the separation distance is less than or equal to one or both of the light-detector pitch and the light-detector spacing.

11. The display amplifier of claim 1, wherein the scene display device comprises a scene display surface, and wherein a surface of the amplifier substrate is disposed in contact with the scene display surface.

12. The display amplifier of claim 1, wherein the scene display device comprises a display array comprising a plurality of display pixels each comprising one or more display light emitters, wherein a first resolution of the plurality of light detectors in the detector array is less than a second resolution of the plurality of display pixels of the scene display device.

13. The display amplifier of claim 1, wherein a first resolution of the plurality of light detectors of the detector array is no more than 10% different from a second resolution of the plurality of pixels of the emitter array.

14. The display amplifier system of claim 1, wherein the amplifier substrate comprises two or more layers laminated together.

15. The display amplifier system of claim 1, wherein the amplifier circuit comprises a plurality of distributed circuits and each of the distributed circuits is connected to one or more of the plurality of the light detectors of the detector array but less than all of the light detectors of the detector array, and to one or more of the light emitters of the emitter array but less than all of the light emitters of the emitter array.

16. The display amplifier system of claim 15, wherein each of the distributed circuits is connected to only one of the plurality of light detectors of the detector array and to only one of the light emitters of the emitter display.

17. The display amplifier of claim 1, wherein the incident light emitted by the scene display device has a first brightness and the amplifier circuit is configured so that the generated light emitted by the plurality of pixels of the second light emitters has a second brightness that is brighter than the first brightness.

18. The display amplifier of claim 1, wherein the display array of first light emitters comprises a plurality of color display pixels configured to display a plurality of display colors at each color display pixel, wherein one or more of the plurality of light detectors comprises a color-detection pixel responsive to a plurality of detectable colors corresponding to at least a portion of the plurality of display colors, and wherein the plurality of pixels of the second light emitters comprise color light-emission pixels configured to emit a plurality of emission colors corresponding to at least a portion of the plurality of display colors.

19. A display amplifier, comprising:

an amplifier substrate having a first side and an opposing second side;

an emitter array comprising a plurality of pixels each comprising one or more light emitters disposed on the first side of the amplifier substrate, wherein each of the pixels is configured to emit generated light from a corresponding location on the emitter array into the amplifier substrate, wherein the amplifier substrate is at least partially transparent to the generated light so that the generated light passes through the amplifier substrate from the first side to the second side;

a detector array comprising a plurality of light detectors disposed on the first side configured to receive incident light emitted from a scene display device onto the first side of the amplifier substrate, wherein the scene display device is configured to display a display image by emitting incident light for each of a plurality of specified positions of the display image, wherein each of the plurality of light detectors is configured to receive, at a specified location on the detector array, the incident light corresponding to one or more of the specified positions of the display image and generate image data corresponding to the incident light received at each specified location; and an amplifier circuit configured to;

receive the image data from the detector array for each of the specified locations, convert the image data to pixel data for each corresponding location of the plurality of pixels of the emitter array, wherein the pixel data for each pixel corresponds to the incident light received at one or more of the specified locations on the detector array and includes instructions for the generated light to be emitted at the pixel for each corresponding location on the emitter array, and control the plurality of pixels of the emitter array to emit the generated light according to the pixel data for each pixel to display a reproduction of at least a portion of the display image using the emitter array.

20. A display amplifier, comprising:

an amplifier substrate having a first side and an opposing second side;

an emitter array comprising a plurality of pixels each comprising one or more first light emitters disposed on the first side of the amplifier substrate, wherein each of the pixels is configured to emit generated light from a corresponding location on the emitter array away from the first side of amplifier substrate;

a detector array comprising a plurality of light detectors disposed on the first side configured to receive incident light emitted from a scene display device onto the second side of the amplifier substrate, wherein the scene display device is configured to display a display image by emitting incident light for each of a plurality of specified positions of the display image, wherein the amplifier substrate is at least partially transparent to the incident light so that the incident light passes through the amplifier substrate from the second side to the first side, wherein each of the plurality of light detectors is configured to receive, at a specified location on the detector array, the incident light corresponding to one or more of the specified positions of the display image and generate image data corresponding to the incident light received at each specified location; and an amplifier circuit configured to;

receive the image data from the detector array for each of the specified locations, convert the image data to pixel data for each corresponding location of the plurality of pixels of the emitter display, wherein the pixel data for each pixel corresponds to the incident light received at one or more of the specified locations on the detector array and includes instructions for the generated light to be emitted at the pixel for each corresponding location on the emitter array, and control the plurality of pixels of the emitter array to emit the generated light according to the pixel data for each pixel to display a reproduction of at least a portion of the display image using the emitter array.

* * * * *